(12) United States Patent
Lu et al.

(10) Patent No.: US 9,294,954 B2
(45) Date of Patent: Mar. 22, 2016

(54) METHOD AND SYSTEM FOR ONLINE COMMUNICATION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/394,625

(22) PCT Filed: Nov. 27, 2013

(86) PCT No.: PCT/CN2013/087921
§ 371 (c)(1),
(2) Date: Oct. 15, 2014

(87) PCT Pub. No.: WO2014/101611
PCT Pub. Date: Jul. 3, 2014

(65) Prior Publication Data
US 2015/0296398 A1    Oct. 15, 2015

(30) Foreign Application Priority Data
Dec. 31, 2012    (CN) .......................... 2012 1 0592905

(51) Int. Cl.
*H04W 24/10*    (2009.01)
*H04L 12/64*    (2006.01)

(52) U.S. Cl.
CPC ........... *H04W 24/10* (2013.01); *H04L 12/6418* (2013.01)

(58) Field of Classification Search
CPC .................. H04L 29/12113; H04L 29/12207; H04L 41/0803; H04L 61/1541; H04L 61/20; H04L 12/6418; H04W 12/04; H04W 12/06
See application file for complete search history.

(56) References Cited

U.S. PATENT DOCUMENTS

| 8,698,603 | B2 * | 4/2014 | Jett et al. ............... | H04L 12/189 |
| | | | | 235/375 |
| 9,166,878 | B1 * | 10/2015 | Cook ...................... | H04L 41/08 |
| 2005/0268003 | A1 * | 12/2005 | Wang et al. ............. | H04L 67/02 |
| | | | | 710/36 |
| 2012/0271767 | A1 | 10/2012 | Bonnell et al. | |

\* cited by examiner

*Primary Examiner* — Kwasi Karikari
(74) *Attorney, Agent, or Firm* — Hammer & Associates, P.C.

(57) ABSTRACT

A method for online communication. The method comprises the following steps: a host obtaining user data, generating a network data packet according to the user data, and sending the generated network data packet to a mobile device; the mobile device parsing the received network data packet, and converting obtained effective data into a corresponding instruction; the mobile device coding the instruction, and sending first coding data obtained by coding to an external device; and the external device decoding the received first coding data, performing corresponding processing according to the instruction obtained by decoding, coding an obtained processing result, and sending second coding data obtained by coding to the mobile device. By means of the present invention, an external device can be commissioned on a host end, thereby improving the working efficiency of commissioning the external device.

23 Claims, 3 Drawing Sheets

METHOD AND SYSTEM FOR ONLINE COMMUNICATION

TECHNICAL FIELD

The present invention relates to communication technology field, more particularly relating to an online communication method and a system thereof.

PRIOR ART

An iOS (APPLE operation system) device is a device using iOS as its operating system, includes products of APPLE such as iPhone, iPad, iPod Touch and Apple TV. Android device is a device using Android as its operating system. With rapid popularity of iOS device and Android device, iOS device and Android device are used widely day by day. At present, testing a peripheral of an iOS device or a peripheral of an Android device is directly implemented in a development environment.

The inventors find at least following shortcomings in the prior art when implementing the invention.

For an iOS device and an Android device respectively using iOS operating system and Android operating system, the strong exclusiveness of the two above operating systems prevents other development tools from being used, results in complicate test of a peripheral on an iOS operating system or a peripheral on an Android operating system and therefore leads to low efficiency.

SUMMARY OF THE INVENTION

The object of the present invention is to provide an online communication method and system, which are used for solving a problem of a complicate test of a peripheral as in prior art.

Thus, according to one aspect of the present invention, there is provided an online communication method wherein the method is used in a system comprising a mobile device, a host and a peripheral, and the method comprises the following steps:

Step A1, obtaining user data by the host;

Step A2, generating a networking data packet according to user data, a host port number, a mobile device port number, a host IP address and a mobile phone IP address by the host;

Step A3, sending the networking data packet to the mobile device by the host;

Step A4, parsing the received networking data packet by the mobile device;

Step A5, converting the parsed valid data into a corresponding instruction by the mobile device;

Step A6, encoding the instruction by the mobile device;

Step A7, sending the first encoded data obtained by encoding to the peripheral by the mobile device;

Step A8, decoding the received first encoded data by the peripheral, and performing a corresponding process according to the instruction obtained by decoding;

Step A9, encoding the obtained processed result by the peripheral;

Step A10, sending the second encoded data to the mobile device by the peripheral;

Step A11, decoding the received second encoded data by the mobile device so as to obtain a processed result;

Step A12, determining whether the processed result is correct by the mobile device, if yes, going to Step A13; otherwise, going to Step A15;

Step A13, converting the valid data in the processed result into data in the same form of the user data by the mobile device;

Step A14, generating a networking data packet according to the converted data, the host port number, the mobile phone port number, the host IP address and the mobile phone IP address, and sending the generated networking data packet to the host, and going to Step A16 by the mobile device;

Step A15, generating the networking data packet according to the processed result, the host port number, the mobile phone port number, the host IP address and the mobile device IP address, and sending the generated networking data packet to the host by the mobile device;

Step A16, parsing the received networking data packet by the host; and

Step A17, displaying the parsed result by the host.

Preferably, after obtaining user data by the host, the method further comprises:

determining whether a preset character is included in the user data by the host;

generating a networking data packet according to the user data, the host port number, the mobile device port number, the host IP address and the mobile device IP address, and sending the networking data packet to the mobile device by the host, comprises:

in case that the preset character is included in the user data, dividing the user data into a plurality of data segments according to a position where the preset character is in the user data by the host, selecting an unprocessed data segment from the divided data segments, generating the networking data packet according to the selected data segment, the host port number, the mobile device port number, the host IP address and the mobile device IP address, and sending the generated networking data packet to the mobile device by the host;

in case that the preset character is not included in the user data, generating the networking data packet according to the user data, the host port number, the mobile device port number, the host IP address and the mobile device IP address, and sending the networking data packet to the mobile device by the host;

after parsing the received networking data packet and displaying the parsed result by the host, the method further comprises:

determining whether any unprocessed data segment is included in the divided data segments by the host, if yes, selecting an unprocessed data segment from the divided data segments, and generating a networking data packet according to the selected data segment, the host port number, the mobile device port number, the host IP address and the mobile device IP address; and sending the generated data packet to the mobile device, and returning to Step A4; otherwise, ending the process.

Preferably, the instruction is an application protocol data unit (APDU) instruction.

Preferably, before sending the generated networking data packet to the mobile device by the host, the method further comprises:

listening a preset port by the mobile device, creating a connection descriptor corresponding to the host in case of listening a connecting request which is initiated by the host to the preset port, and establishing a connection with the host by the mobile device;

sending the generated networking data packet to the mobile device by the host comprises:

sending the networking data packet to the mobile device according to the connection descriptor by the host; and sending the generated networking data packet to the host by the mobile device comprises:

sending the networking data packet to the host according to the connection descriptor by the mobile device.

Preferably, before establishing a connection with the host by the mobile device, the method further comprises:

sending a connecting request to the mobile device according to an IP address of the mobile device and a port number of the preset port by the host.

Preferably, sending the networking data packet to the host according to the connection descriptor by the mobile device comprises:

taking the connection descriptor, the networking data packet and length of the networking data packet as a parameter by the mobile device, invoking Send function, and sending the networking data packet to the host by the mobile device.

Preferably, converting the parsed valid data into a corresponding instruction by the mobile device comprises:

converting the parsed valid data into a corresponding NSString (next step string) type of data from NSData (next step data) type of data by the mobile device, converting NSString type of data into corresponding char* type (character type) of data, invoking StrToHex (string to hexadecimal) function, converting the char* type of data into a corresponding byte type of data, and taking the byte type of data as the converted instruction; or converting the parsed valid data into the byte type of data from the String type of data by invoking StringToHex function and taking the byte type of data as the converted instruction by the mobile device.

Preferably, before encoding the instruction and sending the first encoded data to the peripheral by the mobile device, the method further comprises:

detecting the peripheral connected with itself by the mobile device; and sending the first encoded data to the peripheral by the mobile device comprises:

sending the first encoded data to the peripheral in case that the mobile device detects only one peripheral connecting with itself; and sending the first encoded data to the peripheral connecting with itself via a preset interface in case that the mobile device detects more peripherals connecting with itself.

Preferably, determining whether the processed result is correct by the mobile device comprises:

obtaining a verification data in the processed result by the mobile device, checking for whether the verification data is a preset data, if yes, determining that the processed result is correct; otherwise, determining that the processed result is not correct.

Preferably, converting the valid data in the processed result into data in the same form of the user data by the mobile device comprises:

converting the valid data into a corresponding char type of data from the NSMUtableData (a kind of NSData, which can be modified by a function "MUtable" in a computer development language $C^{++}$ or data modified by a mutable (Mutable) function in, for example, $C^{++}$) type of data by the mobile device, converting the char type of data into the corresponding NSString type of data, and taking the NSString type of data as the converted data; or converting the valid data into the String type of data from the byte type of data by the mobile device, and taking the String type of data as the converted data.

Preferably, generating a networking data packet according to user data, a host port number, a mobile device port number, a host IP address and a mobile device IP address by the host comprises:

packeting according to the user data, the host port number and the mobile device port number so as to obtain a transfer data packet by the host;

packeting according to the transfer data packet, the host IP address and the mobile device IP address so as to obtain the networking data packet by the host; and parsing the received networking data packet to obtain valid data by the mobile device comprises:

parsing the received networking data packet to obtain the transfer data packet by the mobile device, and parsing the transfer data packet to obtain the valid data.

Preferably, decoding the received second encoded data to obtain the processed result by the mobile device comprises:

rectifying the second encoded data, and decoding the rectified second encoded data so as to obtain first decoded data by the mobile device; and decoding a data unit in the first decoded data to obtain a second decoded data by the mobile device, determining whether the second decoded data is correct according to the verification data in the second decoded data, if yes, taking the data in the second decoded data other than the verification data as the processed result; otherwise, discarding the second decoded data.

According to another aspect of the present invention, there is provided an online communication system, characterized in that said system comprises a mobile device, a host and a peripheral; in which the host comprises an obtaining module configured to obtain user data;

a first generating module configured to generate a networking data packet according to the user data, a host port number, a mobile device port number, a host IP address and a mobile device IP address;

a first sending module configured to send the networking data packet generated by the first generating module to the mobile device;

a first receiving module configured to receive the networking data packet from the mobile device and trigger a second determining module;

a first parsing module configured to parse the networking data packet received by the first receiving module;

a displaying module configured to display a parsing result of the first parsing module; and the mobile device comprises:

a second receiving module configured to receive the networking data packet from the host and the second encoded data from the peripheral;

a second parsing module configured to parse the networking data packet received by the second receiving module so as to obtain valid data;

a converting module configured to convert the valid data parsed by the second parsing module into a corresponding instruction, and convert the valid data in the processed result into data in the same form of the user data in case that a third determining module determines that the processed result is correct;

a first encoding module configured to encode the instruction converted by the first converting module so as to obtain first encoded data;

a first decoding module configured to decode the second encoded data received by the second receiving module so as to obtain a processed result;

a third determining module configured to determine whether the processed result obtained by the first decoding module is correct;

a second generating module configured to generate a networking data packet according to the data converted by the first converting module, the host port number, the mobile device port number, the host IP address and the mobile device IP address, and generate the networking data packet according to the processed result, the host port number, the mobile device port number, the host IP address and the mobile device IP address in case that the third determining module determines that the processed result is not correct;

a second sending module configured to send the first encoded data obtained by the first encoding module to the peripheral, and send the networking data packet generated by the second generating module to the host; and the peripheral comprises:

a third receiving module configured to receive the first encoded data from the mobile device;

a second decoding module configured to decode the first encoded data received by the third receiving module so as to obtain the instruction;

a processing module configured to perform a corresponding process according to the instruction decoded by the second decoding module;

a second encoding module configured to encode the processed result of the processing module so as to obtain the second encoded data; and a third sending module configured to send the second encoded data encoded by the second encoding module to the mobile device.

Preferably, the host further comprises a first determining module configured to determine whether there is a preset character in the user data obtained by the obtaining module;

a dividing module configured to divide the user data into a plurality of data segments according to a position where the preset character is in the user data in case that the first determining module determines that there is a preset character in the user data;

a selecting module configured to select an unprocessed data segment from the data segments divided by the dividing module;

a second determining module configured to determine whether there is an unprocessed data segment in the divided data segments, if yes, trigger the selecting module; and the first generating module configured to generated the networking data packet according to the data segment selected by the selecting module, the host port number, the mobile device port number, the host IP address and the mobile device IP address; and generate the networking data packet according to the data segment selected by the selecting module, the host port number, the mobile device port number, the host IP address and the mobile device IP address in case that the first determining module determines that there is not the preset character in the user data.

Preferably, the instruction is an application protocol data unit (APDU) instruction.

Preferably, the mobile device comprises:

a listening module configured to listen a preset port;

a creating module configured to create a connection descriptor corresponding to the host and establishing a connection with the host in case that the listening module listens a connecting request initiated by the host to the preset port;

the first sending module configured to send the networking data packet generated by the first generating module to the mobile device according to the connection descriptor; and the second sending module configured to send the first encoded data encoded by the first encoding module to the peripheral, and send the networking data packet generated by the second generating module to the host according to the connection descriptor.

Preferably, the host comprises: a connecting module configured to send a connecting request to the mobile device according to the mobile phone IP address and a port number of the preset port.

Preferably, the second sending module is configured to send the first encoded data encoded by the first encoding module to the peripheral, and take the connection descriptor, the networking data packet and a length of the networking data packet as parameters, invoke Send function, and send the networking data packet to the host.

Preferably, the first converting module is configured to convert the valid data parsed by the second parsing module into the corresponding NSString type of data from the NSData type of data, convert the NSString type of data into a corresponding char* type of data, invoke StrToHex function, convert the char* type of data into a corresponding byte type of data, take the byte type of data as the converted instruction; or invoke the StringToHex function, and convert the valid data parsed by the second parsing module into the byte type of data from the String type of data, and take the byte type of data as the converted instruction; and in case that the third determining module determines that the processed result is correct, convert the valid data in the processed result into a corresponding char type of data from the NSMUtableData type of data, convert the char type of data into corresponding the NSString type of data, and take the NSString type of data as the converted data; or convert the valid data in the processed result into the String type of data from the byte type of data, and take the String type of data as the converted data.

Preferably, the mobile device comprises:

a detecting module configured to detect a peripheral connecting with the mobile device; and the second sending module configured to send the networking data packet generated by the second generating module to the host, and in case that the detecting module detects only one peripheral connecting with itself, send the first encoded data to the peripheral; in case that the detecting module detects more peripherals connecting with itself, send the first encoded data to the peripheral connecting with itself via a preset interface.

Preferably, the third determining module is configured to obtain a verification data in the processed result, and check for whether the verification data is the preset data, if yes, determine that the processed result is correct; otherwise, determine that the processed result is not correct.

Preferably, the first generating module is configured to packet to obtain a transfer data packet according to the user data, the host port number and the mobile device port number; packet to obtain the networking data packet according to the transfer data packet, the host IP address and the mobile device IP address; and the second parsing module is configured to parse the networking data packet received by the second receiving module so as to obtain the transfer data packet, and parse the transfer data packet so as to obtain the valid data.

Preferably, the first decoding module is configured to rectify the second encoded data, decode the rectified second encoded data so as to obtain the first encoded data; and decode a data unit in the first decoded data so as to obtain the second decoded data, determine whether the second decoded data is correct according to the verification data in the second decoded data, if yes, take the data in the second decoded data other than the verification data as the processed result; otherwise, discard the second decoded data.

According to the present invention, a host establishing a connection with a mobile device and communicating with a peripheral via the mobile device meets the purpose of testing a peripheral on a host side, and therefore improves a working efficiency of testing a peripheral.

DETAILED DESCRIPTION OF EMBODIMENTS OF THE PRESENT INVENTION

A clear and complete description is given to the solution of the embodiments of the present invention in conjunction with the drawings of the invention. Obviously, the described embodiments are only a part of the embodiments, not the whole embodiments. All other embodiments obtained by those skilled in the art without involving an inventive effort based on the embodiments of the invention should fall within the scope of protection of the invention.

Figure 1:
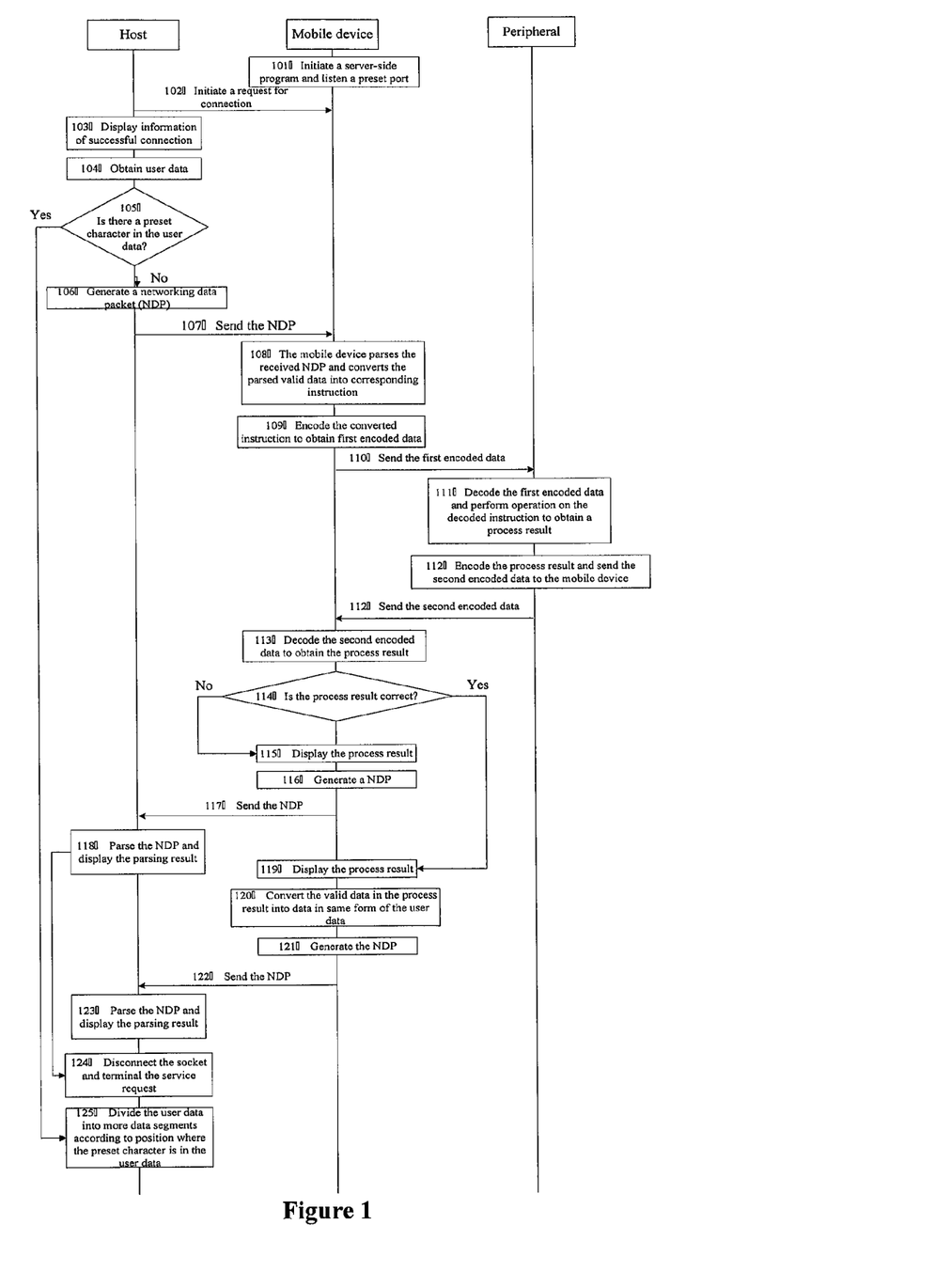
FIG. 1 and FIG. 2 are a flow chart of an online communication method of an embodiment of the invention.
Figure 2:
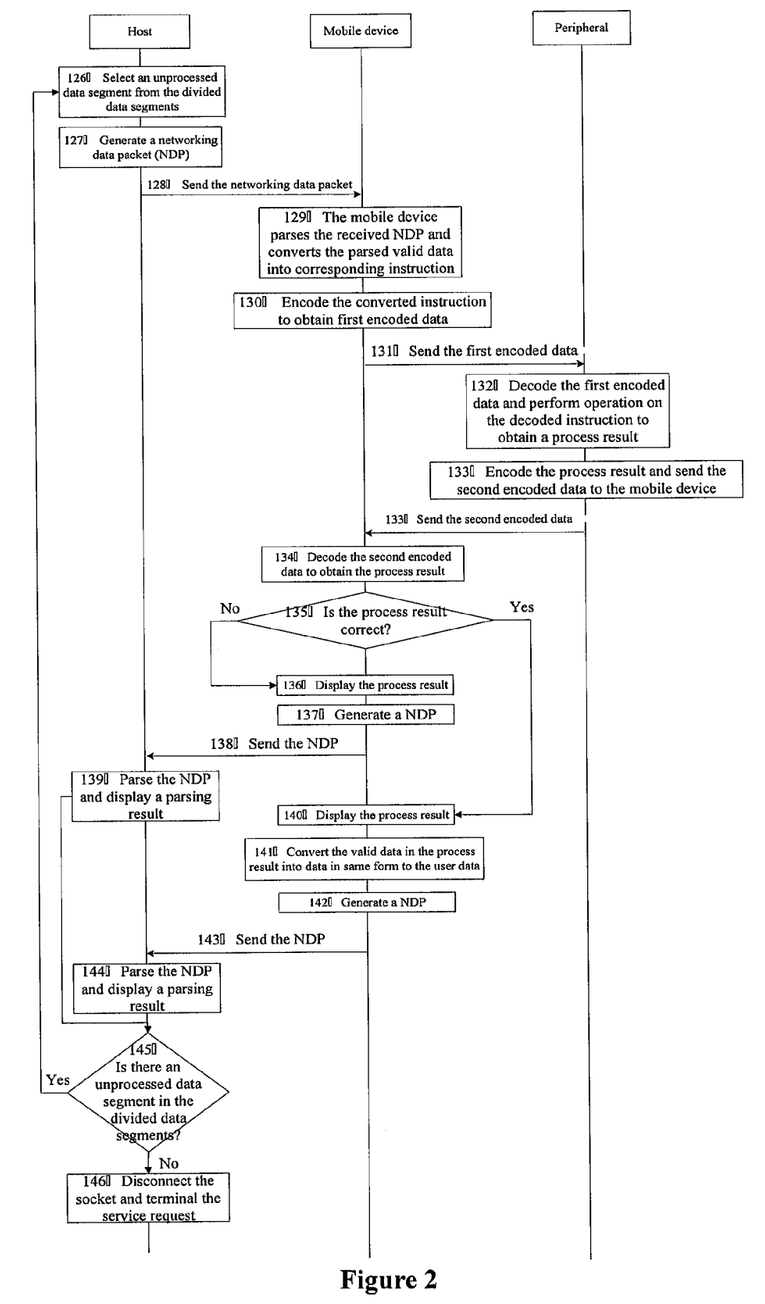

As illustrated in FIG. 1 and FIG. 2, a flow chart of an online communication method is provided by the embodiment 1 of the invention. The method is applied in a system including a host, a mobile device and a peripheral. The mobile device connects with the peripheral via a dock interface or an audio interface, the host communicates with the mobile device via socket communication mechanism; the mobile device acts as a server side in the socket communication mechanism and the host acts as a client side in the socket communication mechanism. The socket is applied for establishing networking connection, and in case of a successful connection, both the mobile device and the host generate a socket instance and complete necessary session by operating on the instance. The socket is connected by three separate steps, respectively the server listening, the client side requesting, and the connection & confirmation. The mobile device can be an iOS device or an Android device. The flow chart of the embodiment 1 of the invention includes steps as below.

Step 101, the mobile device initiates a server program to listen a preset port.

For example, in case that the mobile device is an iOS device, the server program invokes a Listen function and takes a port number of the preset port as a parameter of the Listen function for listening the preset port, such as 8080 port. In case that a socket connection request being initiated by a client side is listened, the server program creates a connection descriptor corresponding to the client side by invoking Accept function so as to establish connection with the client side; and in case that a socket connection request being initiated by a client side is not listened, goes on listening.

In case that the mobile device is an Android device, the server program invokes Serversocket function and takes a port number of the preset port as a parameter of the Serversocket function for listening the preset port, such as 8080 port. In case that a socket connection request being initiated by a client side is listened, the server program creates a connection descriptor corresponding to the client side by invoking Accept function so as to establish a connection with the client side; and in case that a socket connection request being initiated by a client side is not listened, goes on listening.

Step 102, the host obtains a mobile phone IP address input by a user and initiates a connecting request to the mobile device according to the IP address.

Specifically, the host initiates a client program; in case of detecting Connect button clicked by the user on the program interface, the client program triggers OnConnect( ) event, obtains information input by the user in a first edit frame of the program interface, takes the information as the mobile device IP address input by the user, takes the mobile phone IP address input by the user and the mobile device port number as a parameter, invokes Connect function in DLL (Dynamic Link Library) and initiates a connecting request to the mobile device. For example, the mobile device IP address input by the user is 192.168.0.1 and the port number of the mobile device is defaulted as 8080.

Step 103, the host displays information of successful connection.

Further, at the same time, the mobile device displays information of having connected with the host.

For example, if Successful Connection is displayed in the interface of the client program in the host and the host IP address is 192.168.0.2, "Connection with 192.168.0.2 has been established is displayed in the interface of the server program of the mobile device.

It is noted that in other embodiments of the invention, if the host fails to connect with the mobile device, the host displays "Fail to connect, for example, "Fail to connect with 192.168.0.2 is displayed in the interface of the client program of the host.

Step 104, the host obtains user data.

Specifically, in case of detecting a Communication button being clicked by the user, the client program in the host triggers OnSendandrecv( ) event and obtains information input by the user in a second Edit frame of the program interface, takes the information as the user data, in which the user data can be a string or a binary number input by the user, for example, "0084000008 or "0084000008\n\r0084000004.

Step 105, the host determines whether a preset character is included in the user data, if yes, Step 125 is executed; while if no, Step 106 is executed.

Where, the preset character can be an Enter character and a line feed character, for example "\r\n.

Step 106, the host generates a networking data packet according to the user data, a host port number, a mobile device port number, a host IP address and a mobile device IP address.

Specifically, the host can packet to obtain a transfer data packet according to the user data, the host port number and the mobile device port number, and packet to obtain the networking data packet according to the transfer data packet, the host IP address, and the mobile device IP address.

It is noted that in other embodiments of the invention, the host can packet to obtain the transfer data packet according to a serial number, a confirmation number, a data offset, a checksum, an option field, a fill field, user data, the host port number and the mobile device port number, and packet to obtain the networking data packet according to the transfer data packet, a version number, an identification, expired time, a fill item, the host IP address and the mobile device IP address.

Step 107, the host sends the networking data packet to the mobile device.

Specifically, the client program in the host can take a connection descriptor corresponding to it, the networking data packet and length of the networking data packet as a parameter, invoke the SendAndRecvData function in DLL, for example, the Send function in socket, and send the networking data packet to the mobile device by Wi-Fi.

It is noted that in other embodiments of the invention, the host displays information of failed sending in case of failing to send the networking data packet to the mobile device. For example, a "Failed data sending" is displayed in the interface of the client-sided program of the host.

Step 108, the mobile device parses the received networking data packet and converts the parsed valid data so as to obtain corresponding instruction.

Specifically, in case that the mobile device is an iOS device, the server program in the mobile device invokes a recv function to receive the networking data packet from the host, parses the networking data packet to obtain the transfer data packet, parses the transfer data packet to obtain the valid data, converts the valid data into a corresponding NSString type of data from the NSData type of data, converts the NSString type of data into a corresponding char* type of data, and invokes the StrToHex function, converts the char* type of data into corresponding byte type of data, for example, the converted instruction. The instruction can be APDU (Application Protocol Data Unit) instruction, or other type of the instruction.

In case that the mobile device is an Android device, the server program in the mobile device invokes the BufferedReader function to receive the networking data packet from the host, parses the networking data packet, converts the parsed valid data into the byte type of data from String type of data by invoking the StringToHex function, for example, the converted instruction. The instruction is the APDU instruction or other type of instruction.

For example, in case that the valid data parsed by the mobile device is 0084000008, "data 0084000008 from 192.168.0.2 is received" is displayed in the interface of the server program, and the valid data is converted into APDU instruction of hexadecimal 0x00, 0x84, 0x00, 0x00, 0x08, for example, a random number obtaining instruction.

Step 109, the mobile device encodes the converted instruction to obtain first encoded data.

Step 110, the mobile device sends the first encoded data to the peripheral.

Specifically, the server program in the mobile device detects the peripheral connecting with itself, and in case of detecting only one peripheral connecting with itself, takes the first encoded data as a parameter, invokes the audio_transmit function and sends the first encoded data to the peripheral; in case of detecting more peripherals connecting with itself, takes the converted instruction as a parameter, invokes the audio_transmit function and sends the instruction to the peripheral connecting with itself via a preset interface, such as a dock interface or an audio interface.

It is noted that in other embodiments of the invention, in case that the mobile device fails to send the first encoded data to the peripheral, the mobile device displays information of failed sending, for example, "Timeout is returned by KEY" is displayed in the interface of the server program of the mobile device.

Step 111, the peripheral decodes the received first encoded data and processes the decoded instruction to obtain a processed result.

Where the processed result includes valid data and verification data. For example, in case that the decoded instruction is random number obtaining instruction, the peripheral generates a random number, takes the random number as the valid data, appends the verification data to the valid data as the processed result, for example, 25849632576849239000.

Step 112, the peripheral encodes the processed result and sends the second encoded data to the mobile device.

It is noted that, in case that the peripheral fails to send the second encoded data to the mobile device, the peripheral displays information of failed sending.

Step 113, the mobile device decodes the received second encoded data to obtain the processed result.

Specifically, the mobile device rectifies the second encoded data, decodes the rectified second encoded data to obtain first decoded data; the mobile device decodes data unit in the first decoded data to obtain the second decoded data and determines whether the second decoded data is correct according to the verification data in the second decoded data, if the second decoded data is correct, takes the data in the second decoded data other than the verification data as the processed result; if the second decoded data is not correct, discards the second decoded data.

Step 114, the mobile device determines whether the processed result is correct, if the processed result is correct, Step 119 is executed; while if the processed result is not correct, Step 115 is executed.

Specifically, the server program in the mobile device can invoke the audio_transmit function to receive the second encoded data from the peripheral, decodes the second encoded data to obtain the processed result, obtains the verification data in the processed result, checks for whether the verification data is the preset data, for example 0x9000, if the verification data is the preset data, determines that the processed result is correct; if the verification data is not the preset data, determines that the processed result is not correct.

Step 115, the mobile device displays the processed result returned by the peripheral.

For example, in case that the processed result returned by the peripheral is error 6d00, 6d00 is displayed in the interface of the server program of the mobile device.

Step 116, the mobile device generates a networking data packet according to the processed result, the host port number, the mobile device port number, the host IP address and the mobile device IP address.

Step 117, the mobile device sends the networking data packet to the host.

Step 118, the host parses the received networking data packet, displays the parsed result and Step 124 is executed.

For example, in case that the parsed result is error 6d00, 6d00 is displayed in the interface of the client program of the host.

Step 119, the mobile device displays the processed result. For example, "Data returned by KEY is 25849632576849239000" is displayed in the interface of the server program of the mobile device.

Step 120, the mobile device converts the valid data in the processed result into data in the same form of the user data.

Specifically, in case that the mobile device is an iOS device, the server program of the mobile device invokes the HexToStr function, converts the valid data in the processed result into a corresponding char type of the data from the NSMUtableData type of data and converts the char type of data into corresponding the NSString type of data, for example, the data in the same form of the user data.

In case that the mobile device is an Android device, the server program in the mobile device invokes the HexToString function and converts the valid data in the processed result into String type of data from the byte type of data, for example, the data in the same form of the user data.

Step 121, the mobile device generates the networking data packet according to the converted data, the host port number, the mobile device port number, the host IP address and the mobile device IP address.

Step 122, the mobile device sends the generated networking data packet to the host.

Specifically, the server program in the mobile device takes a connection descriptor corresponding to the host, the generated networking data packet and length of the generated networking data packet as a parameter, invokes the Send function and sends the generated networking data packet to the host by Wi-Fi.

It is noted that, in case that the mobile device fails to send the networking data packet to the host, the mobile device displays information of failed sending, for example, "Failed sending" is displayed in the interface of the server program in the mobile device.

Step 123, the host parses the received networking data packet and displays the parsed result.

Specifically, the host can display the parsed result in the interface of the client program, for example, "2584963257684923" displayed in a third display frame of the client program.

Step 124, the host disconnects the socket and terminates the request for service.

Specifically, in case of detecting a Disconnect button clicked by the user, the client program in the host triggers the DisConnectServer( ), invokes the closesocke function, closes the socket connection and terminates the request for service.

Step 125, the host divides the user data into a plurality of data segments according to a position where a preset character is in the user data.

Specifically, in case that there is one preset character in the user data, the client program in the host can take the data in front of or behind of the preset character as two separate data segments after dividing; in case that there are a plurality of preset characters in the user data, the client program in the host can take the data in front of the first preset character, the data behind of the last preset character, and the data between the two primarily preset characters as the plurality of data segments after dividing.

Step 126, the host selects an unprocessed data segment from the divided data segments.

Step 127, the host generates a networking data packet according to the selected data segment, the host port number, the mobile device port number, the host IP address and the mobile device IP address.

Specifically, the host packets so as to obtain a transfer data packet according to the selected data segment, the host port number and the mobile device port number; and packets to obtain the networking data packet according to the transfer data packet, the host IP address and the mobile device IP address.

It is noted that in other embodiments of the invention, the host can packet to obtain the transfer data packet according to the serial number, the confirmation number, a data offset, a checksum, an option field, a fill field, the selected data segment, the host port number and the mobile device port number and packet to obtain the networking data packet according to the transfer data packet, the version number, the identification, the expired time, the fill field, the host IP address and the mobile device IP address.

Step 128, the host sends the networking data packet to the mobile device.

Specifically, the client program in the host takes the connection descriptor corresponding to it, the networking data packet and length of the networking data packet as a parameter; and invokes the SendAndRecvData function in DLL, for example, the Send function in the socket, and sends the networking data packet to the mobile device by Wi-Fi.

It is noted that in other embodiment of the invention, in case that the host fails to send the networking data packet to the mobile device, the host displays information of failed sending, for example, "fail to send data" is displayed in the interface of the client program in the host.

Step 129, the mobile device parses the received networking data packet and converts the parsed valid data to obtain corresponding instruction.

Specifically, in case that the mobile device is an iOS device, the server program in the mobile device invokes the recv function to receive the networking data packet from the host, parses the networking data packet, converts the parsed valid data into a corresponding NSString type of data from the NSData type of data, converts the NSString type of data into corresponding char* type of data, invokes the StrToHex function and converts the char* type of data into corresponding byte type of data, for example, the converted instruction.

In case that the mobile device is an Android device, the service-side program in the mobile device invokes the BufferedReader function to receive the networking data packet from the host, parses the networking data packet and invokes the StringToHex function to convert the parsed valid data into byte type of data from String type of data, for example, the converted instruction.

For example, in case that the valid data parsed by the mobile device is 0084000008, "Data 0084000008 sent by 192.168.0.2 is received" is displayed in the interface of the server program, and the valid data is converted into a hexadecimal APDU instruction 0x00, 0x84, 0x00, 0x00, 0x08, for example, the random number obtaining instruction.

Step 130, the mobile device encodes the converted instruction to obtain first encoded data.

Step 131, the mobile device sends the first encoded data to the peripheral.

Specifically, in case of detecting a peripheral connecting with itself and only one peripheral connecting with itself, the server program in the mobile device takes the first encoded data as a parameter, invokes the audio_transmit function and sends the first encoded data to the peripheral; in case of detecting a plurality of peripherals connecting with itself, the server program in the mobile device takes the converted instruction as a parameter, invokes audio_transmit function and sends the instruction to the peripheral connecting with itself via a preset interface, for example, a dock interface or an audio interface.

It is noted that in other embodiment of the invention, in case of failing to send the first encoded data to the peripheral, the mobile device displays information of failed sending, for example "Timeout is returned by the KEY" is displayed in the interface of the server program in the mobile device.

Step 132, the peripheral decodes the received first encoded data and performs corresponding process according to the decoded instruction so as to obtain the processed result.

Where, the processed result includes the valid data and the verification data. For example, in case that the converted instruction is random number obtaining instruction, the peripheral generates a random number, takes the random number as the valid data and appends the verification data to the valid data as the processed result, for example, 25849632576849239000.

Step 133, the peripheral encodes the processed result and sends the second encoded data to the mobile device.

It is noted that, in case of failing to send the second encoded data to the mobile device, the peripheral displays information of failed sending.

Step 134, the mobile device decodes the received second encoded data to obtain the processed result.

Step 135, the mobile device determines whether the processed result is correct, if yes, Step 140 is executed; if no, Step 136 is executed.

Specifically, the server program in the mobile device can invoke the audio_transmit function to receive the second encoded data from the peripheral, decode the second encoded data to obtain the processed result, obtain the verification data in the processed result and check for whether the verification data is preset data, for example 0x9000, if yes, determine that the processed result is correct; if not, determine that the processed result is not correct.

Step 136, the mobile device displays a processed result returned by the peripheral.

For example, in case that the processed result returned by the peripheral is error information "6d00", "6d00" is displayed in the interface of the server program of the mobile device.

Step 137, the mobile device generates the networking data packet according to the processed result, the host port number, the mobile device port number, the host IP address and the mobile device IP address.

Step 138, the mobile device sends the networking data packet to the host.

Step 139, the host parses the received networking data packet, displays the parsed result and Step 145 is executed.

For example, in case that the processed result returned by the peripheral is error information "6d00", "6d00" is displayed in the interface of the client program of the host.

Step 140, the mobile device displays the processed result.

For example, "25849632576849239000 is returned by KEY is displayed in the interface of the server program in the mobile device.

Step 141, the mobile device converts the valid data in the processed result into data in the same form of the user data.

Specifically, in case that the mobile device is an iOS device, the server program in the mobile device can invoke the HexToStr function, convert the valid data in the processed result into corresponding char type of data from the NSMUtableData type of data and convert the char type of data into corresponding the NSString type of data, for example, the data in the same form of the user data.

In case that the mobile device is an Android device, the server program in the mobile device can invoke the HexToString function and convert the valid data into String type of data from byte type of data, for example, the data in the same form of the user data.

Step 142, the mobile device generates a networking data packet according to the converted data, the host port number, the mobile device port number, the host IP address, and the mobile device IP address.

Step 143, the mobile device sends the generated networking data packet to the host.

Specifically, the server program in the mobile device can take the connection descriptor, the generated networking data packet and length of the generated networking data packet as a parameter, invoke Send function and send the generated networking data packet to the host by Wi-Fi.

It is noted that in case of failing to send the networking data packet to the host, the mobile device displays information of failed sending, for example, "Failed sending" is displayed on the interface of the server program in the mobile device.

Step 144, the host parses the received networking data packet and displays the parsed result.

Specifically, the host can display the parsed result in the interface of the client program. For example, "2584963257684923" is displayed in the third display frame of the client program.

Step 145, the host determines whether there is an unprocessed data segment in the divided data segments, if yes, Step 126 is executed; if no, Step 146 is executed.

Step 146, the host disconnects the socket and terminates the request for service.

Specifically, in case of detecting a Disconnect button clicked by a user, the client program in the host triggers the DisConnectServer( ) event, invokes the closesocke function, closes socket connection and terminates the request for service.

In the solution disclosed by the invention, the host establishing connection with the mobile device and communicating with the peripheral via the mobile device meets the purpose of testing a peripheral on the host side, and therefore improves a working efficiency of testing the peripheral.

It is noted that in other embodiment of the invention, the host can also generate the networking data packet directly according to the user data, the host port number, the mobile device port number, the host IP address and the mobile device IP address rather than determining whether there is the preset character in the obtained user data; and then send the networking data packet to the mobile device and perform the following steps.

Figure 3:
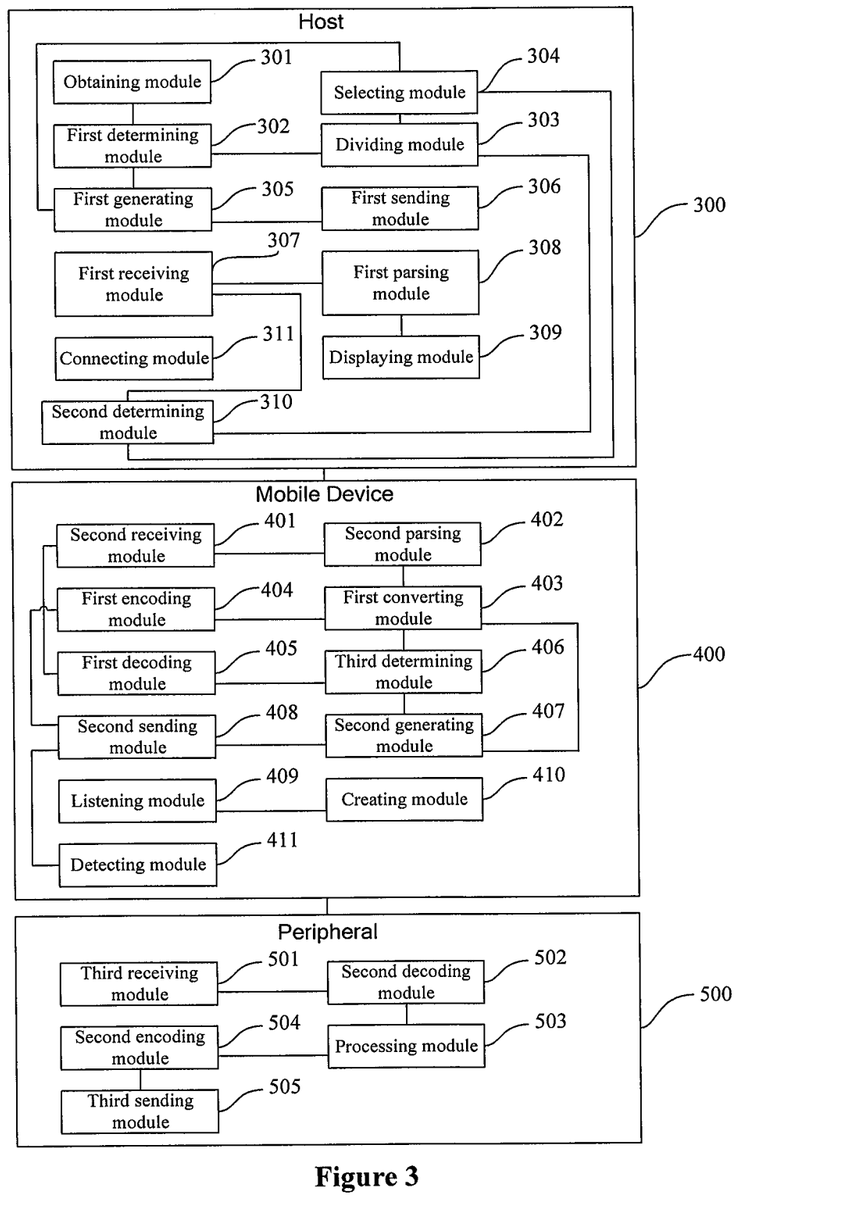
FIG. 3 is a structural diagram of an online communication system of an embodiment of the invention.

As illustrated in FIG. 3, a structural diagram of an online communication system is disclosed by the embodiment of the invention. The system includes a host 300, a mobile device 400 and a peripheral 500.

The host 300 includes an obtaining module 301 configured to obtain user data;

a first determining module 302 configured to determine whether a preset character is included in the user data obtained by the obtaining module 301;

a dividing module 303 configured to divide the user data into a plurality of data segments according to a position where the preset character is in the user data in case that the first determining module 302 determines that there is the preset character in the user data;

a selecting module 304 configured to select an unprocessed data segment from the data segments divided by the dividing module 303;

a first generating module 305 configured to generate a networking data packet according to the data segment selected by the selecting module 304, a host port number, a mobile device port number, a host IP address and a mobile device IP address; and to generate the networking data packet according to the user data, the host port number, the mobile device port number, the host IP address and the mobile device IP address in case that the first determining module 302 determines there is not the preset character in the user data;

a first sending module 306 configured to send the networking data packet generated by the first generating module 305 to the mobile device 400;

a first receiving module 307 configured to receive the networking data packet from the mobile device 400 and trigger a second determining module 310;

a parsing module 308 configured to parse the networking data packet received by the first receiving module 307;

a display module 309 configured to display the result parsed by the first parsing module;

a second determining module 310 configured to determine whether there is an unprocessed data segment in the data segments divided by the dividing module 303, if yes, trigger the selecting module 304; and the host 300 includes a connecting module 311 configured to send a connecting request to the mobile device 400 according to the mobile device 300 IP address and a port number of a preset port.

The mobile device 400 includes a second receiving module 401 configured to receive the networking data packet from the host 300 and second encoded data from the peripheral 500;

a second parsing module 402 configured to parse the networking data packet received by the second receiving module 401;

a first converting module 403 configured to convert valid data parsed by the second parsing module 402 into corresponding instruction, and convert the valid data in the processed result into data in the same form of the user data in case that the third determining module determines that the processed result is correct.

Specifically, the first converting module 403 is configured to convert the valid data parsed by the second parsing module 402 into corresponding NSString type of data from the NSData type of data, convert the NSString type of data into corresponding char* type of data, invoke StrToHex function, convert the char* type of data into corresponding byte type of data and take the converted byte type of data as the converted instruction; or invoke the StringToHex function, convert the valid data parsed by the second parsing module 402 into the byte type of data from String type of data and convert the byte type of data into the converted instruction; and in case that the third determining module 406 determines that the processed result is correct, convert the valid data in the processed result into corresponding char type of data from the NSMUtableData type of data, convert the char type of data into a corresponding NSString type of data and take the NSString type of data as the converted data; or convert the valid data in the processed result into String type of data from byte type of data and take the String type of data as the converted data.

Where the instruction converted by the first converting module 403 can be APDU instruction or other type of instruction.

The first encoding module 404 is configured to encode the instruction converted by the first converting module 403 to obtain the first encoded data.

The first decoding module 405 is configured to decode the second decoded data received by the second receiving module 401 to obtain the processed result.

Specifically, the first decoding module 405 is configured to rectify the second encoded data and decode the rectified second encoded data to obtain the first decoded data; decode the data unit in the first decoded data to obtain the second decoded data and determine whether the second decoded data is correct according to the verification data in the second decoded data, if yes, take the data in the second decoded data other than the verification data as the processed result; if no, discard the second decoded data.

The third determining module 406 is configured to determine whether the processed result decoded by the first decoded module 405 is correct.

Specifically, the third determining module 406 is configured to obtain the verification data in the processed result and check for whether the verification data is the preset data, if yes, determine that the processed result is correct; if no, determine that the processed result is not correct.

The second generating module 407 is configured to generate the networking data packet according to the data converted by the first converting module 403, the host port number, the mobile device port number, the host IP address and the mobile device IP address; in case that the third determining module 406 determines that the processed result is not correct, generate the networking data packet according to the processed result, the host port number, the mobile device port number, the host IP address and the mobile device IP address.

The second sending module 408 is configured to send the first encoded data obtained by the first encoding module 404 to the peripheral 500 and send the networking data packet generated by the second generating module 407 to the host 300.

The first generating module 305 is configured to packet to obtain a transfer data packet according to the data segment selected by the selecting module 304, the host port number and the mobile device port number, and packet so as to obtain the networking data packet according to the transfer data packet, the host IP address and the mobile device IP address.

In case of determining that there is not a preset character in the user data, the first determining module 302 packets to obtain a transfer data packet according to the user data, the host port number and the mobile device port number; and packets so as to obtain the networking data packet according to the transfer data packet, the host IP address and the mobile device IP address.

Correspondingly, the second parsing module 402 is configured to parse the networking data packet received by the second receiving module 401 to obtain the transfer data packet and parse the transfer data packet to obtain the valid data.

The mobile device 400 further includes a listening module 409 configured to listen a preset port;

a creating module 410 configured to create a connection descriptor corresponding to the host and establish connection with the host in case that the listening module 409 listens that the host 300 initiates a connecting request to the preset port;

correspondingly, the first sending module 306 configured to send the networking data packet generated by the first generating module 305 to the mobile device 400 according to the connection descriptor; and the second sending module 408 configured to send the first encoded data encoded by the first encoding module 404 to the peripheral 500 and send the networking data packet generated by the second generating module 407 to the host 300.

Specifically, the second sending module 408 is configured to send the first encoded data encoded by the first encoded module 404 to the peripheral 500; take the connection descriptor, the networking data packet and length of the networking data packet as a parameter, invoke Send function and send the networking data packet to the host 300.

The mobile device 400 further includes:

a detecting module 411 configured to detect the peripheral connecting with the mobile device 300; and correspondingly, the second sending module 408 configured to send the networking data packet generated by the second generating module 407 to the host 300, send the first encoded data to the peripheral in case that the detecting module detects only one peripheral connecting with itself; and send the first encoded data to the peripheral connecting with itself via a preset interface in case that detecting module detects a plurality of peripherals connecting with itself.

The peripheral 500 includes a third receiving module 501 configured to receive the first encoded data from the mobile device 400;

a second decoding module 502 configured to decode the first encoded data received by the third receiving module 501 to obtain the instruction;

a processing module 503 configured to perform corresponding operation on the instruction decoded by the second decoded module 502;

a second encoding module 504 configured to encode the processed result by the processing module 503 to obtain the second encoded data; and a third sending module 505 configured to send the second encoded data obtained by the second encoding module 504 to the mobile device 400.

In the solution disclosed by the present invention, the host establishing a connection with the mobile device and communication with the peripheral via the mobile device meets the purpose of testing a peripheral on the host side, and therefore improves the working efficiency of testing the peripheral.

The steps disclosed in the method of the embodiments of the present invention can be implemented by hardware, a software module executed by a processor or a combination of the above two. The software module can be installed on a random access memory (RAM), a memory, a Read-Only Memory (ROM), an Erasable Programmable Read Only Memory (EPROM), a register, a hard disk, a portable disk, a CD-ROM or in a storage media in other form well-known in the prior art.

The above mentioned are only exemplary embodiments of the invention, not a limit to the scope of protection of the invention, and any amendment or substitution made by those skilled in the art should fall within the scope of protection of the invention. Therefore, the scope of protection of the invention should be based on the appended claims.

The invention claimed is:

1. An online communication method wherein the method is used in a system comprising a mobile device, a host and a peripheral, and the method comprises the following steps:
   Step A1, obtaining user data by the host;
   Step A2, generating a networking data packet according to user data, a host port number, a mobile device port number, a host IP address and a mobile phone IP address by the host;
   Step A3, sending the networking data packet to the mobile device by the host;
   Step A4, parsing the received networking data packet by the mobile device;
   Step A5, converting the parsed valid data into a corresponding instruction by the mobile device;
   Step A6, encoding the instruction by the mobile device;
   Step A7, sending the first encoded data obtained by encoding to the peripheral by the mobile device;
   Step A8, decoding the received first encoded data by the peripheral, and performing a corresponding process according to the instruction obtained by decoding;
   Step A9, encoding the obtained processed result by the peripheral;
   Step A10, sending the second encoded data to the mobile device by the peripheral;
   Step A11, decoding the received second encoded data by the mobile device so as to obtain a processed result;
   Step A12, determining whether the processed result is correct by the mobile device, if yes, going to Step A13; otherwise, going to Step A15;
   Step A13, converting the valid data in the processed result into data in the same form of the user data by the mobile device;
   Step A14, generating a networking data packet according to the converted data, the host port number, the mobile phone port number, the host IP address and the mobile phone IP address, and sending the generated networking data packet to the host, and going to Step A16 by the mobile device;
   Step A15, generating the networking data packet according to the processed result, the host port number, the mobile phone port number, the host IP address and the mobile device IP address, and sending the generated networking data packet to the host by the mobile device;
   Step A16, parsing the received networking data packet by the host; and
   Step A17, displaying the parsed result by the host.

2. The method of claim 1, wherein after obtaining user data by the host, the method further comprises:
   determining whether a preset character is included in the user data by the host;
   generating a networking data packet according to the user data, the host port number, the mobile device port number, the host IP address and the mobile device IP address, and sending the networking data packet to the mobile device by the host, comprises:
   in case that the preset character is included in the user data, dividing the user data into a plurality of data segments according to a position where the preset character is in the user data by the host, selecting an unprocessed data segment from the divided data segments, generating the networking data packet according to the selected data segment, the host port number, the mobile device port number, the host IP address and the mobile device IP address, and sending the generated networking data packet to the mobile device by the host;
   in case that the preset character is not included in the user data, generating the networking data packet according to the user data, the host port number, the mobile device port number, the host IP address and the mobile device IP address, and sending the networking data packet to the mobile device by the host;
   after parsing the received networking data packet and displaying the parsed result by the host, the method further comprises:
   determining whether any unprocessed data segment is included in the divided data segments by the host, if yes, selecting an unprocessed data segment from the divided data segments, and generating a networking data packet according to the selected data segment, the host port number, the mobile device port number, the host IP address and the mobile device IP address; and sending the generated data packet to the mobile device, and returning to Step A4; otherwise, ending the process.

3. The method of claim 1, wherein the instruction is an application protocol data unit (APDU) instruction.

4. The method of claim 1, wherein before sending the generated networking data packet to the mobile device by the host, the method further comprises:
   listening a preset port by the mobile device, creating a connection descriptor corresponding to the host in case of listening a connecting request which is initiated by the host to the preset port, and establishing a connection with the host by the mobile device;
   sending the generated networking data packet to the mobile device by the host comprises:
   sending the networking data packet to the mobile device according to the connection descriptor by the host; and
   sending the generated networking data packet to the host by the mobile device comprises:
   sending the networking data packet to the host according to the connection descriptor by the mobile device.

5. The method of claim 4, wherein before establishing a connection with the host by the mobile device, the method further comprises:

sending a connecting request to the mobile device according to an IP address of the mobile device and a port number of the preset port by the host.

6. The method of claim 4, wherein sending the networking data packet to the host according to the connection descriptor by the mobile device comprises:
taking the connection descriptor, the networking data packet and length of the networking data packet as a parameter by the mobile device, invoking Send function, and sending the networking data packet to the host by the mobile device.

7. The method of claim 1, wherein converting the parsed valid data into a corresponding instruction by the mobile device comprises:
converting the parsed valid data into a corresponding next step string (NSString) type of data from next step data (NSData), type of data by the mobile device, converting NSString type of data into corresponding character type (char* type) of data, invoking string to hexadecimal (StrToHex) function, converting the char* type of data into a corresponding byte type of data, and taking the byte type of data as the converted instruction; or
converting the parsed valid data into the byte type of data from the String type of data by invoking StrToHex function and taking the byte type of data as the converted instruction by the mobile device.

8. The method of claim 1, wherein before encoding the instruction and sending the first encoded data to the peripheral by the mobile device, the method further comprises:
detecting the peripheral connected with itself by the mobile device; and
sending the first encoded data to the peripheral by the mobile device comprises:
sending the first encoded data to the peripheral in case that the mobile device detects only one peripheral connecting with itself; and sending the first encoded data to the peripheral connecting with itself via a preset interface in case that the mobile device detects more peripherals connecting with itself.

9. The method of claim 1, wherein determining whether the processed result is correct by the mobile device comprises:
obtaining verification data in the processed result by the mobile device, checking for whether the verification data is a preset data, if yes, determining that the processed result is correct; otherwise, determining that the processed result is not correct.

10. The method of claim 1, wherein converting the valid data in the processed result into data in the same form of the user data by the mobile device comprises:
converting the valid data into a corresponding char type of data from the data modified by a mutable function (NSMUtableData) type of data by the mobile device, converting the char type of data into the corresponding next step string (NSString) type of data, and taking the NSString type of data as the converted data; or
converting the valid data into the String type of data from the byte type of data by the mobile device, and taking the String type of data as the converted data.

11. The method of claim 1, wherein generating a networking data packet according to user data, a host port number, a mobile device port number, a host IP address and a mobile device IP address by the host comprises:
packeting according to the user data, the host port number and the mobile device port number so as to obtain a transfer data packet by the host;
packeting according to the transfer data packet, the host IP address and the mobile device IP address so as to obtain the networking data packet by the host; and
parsing the received networking data packet to obtain valid data by the mobile device comprises:
parsing the received networking data packet to obtain the transfer data packet by the mobile device, and parsing the transfer data packet to obtain the valid data.

12. The method of claim 1, wherein decoding the received second encoded data to obtain the processed result by the mobile device comprises:
rectifying the second encoded data, and decoding the rectified second encoded data so as to obtain first decoded data by the mobile device; and
decoding a data unit in the first decoded data to obtain a second decoded data by the mobile device, determining whether the second decoded data is correct according to the verification data in the second decoded data, if yes, taking the data in the second decoded data other than the verification data as the processed result; otherwise, discarding the second decoded data.

13. An online communication system, characterized in that said system comprises a mobile device, a host and a peripheral; in which the host comprises
an obtaining module configured to obtain user data;
a first generating module configured to generate a networking data packet according to the user data, a host port number, a mobile device port number, a host IP address and a mobile device IP address;
a first sending module configured to send the networking data packet generated by the first generating module to the mobile device;
a first receiving module configured to receive the networking data packet from the mobile device and trigger a second determining module;
a first parsing module configured to parse the networking data packet received by the first receiving module;
a displaying module configured to display a parsing result of the first parsing module; and
the mobile device comprises:
a second receiving module configured to receive the networking data packet from the host and the second encoded data from the peripheral;
a second parsing module configured to parse the networking data packet received by the second receiving module so as to obtain valid data;
a converting module configured to convert the valid data parsed by the second parsing module into a corresponding instruction, and convert the valid data in the processed result into data in the same form of the user data in case that a third determining module determines that the processed result is correct;
a first encoding module configured to encode the instruction converted by the first converting module so as to obtain first encoded data;
a first decoding module configured to decode the second encoded data received by the second receiving module so as to obtain a processed result;
a third determining module configured to determine whether the processed result obtained by the first decoding module is correct;
a second generating module configured to generate a networking data packet according to the data converted by the first converting module, the host port number, the mobile device port number, the host IP address and the mobile device IP address, and generate the networking data packet according to the processed result, the host port number, the mobile device port number, the host IP address and the mobile device IP address in case that the third determining module determines that the processed result is not correct;
a second sending module configured to send the first encoded data obtained by the first encoding module to the peripheral, and send the networking data packet generated by the second generating module to the host; and
the peripheral comprises:
a third receiving module configured to receive the first encoded data from the mobile device;
a second decoding module configured to decode the first encoded data received by the third receiving module so as to obtain the instruction;
a processing module configured to perform a corresponding process according to the instruction decoded by the second decoding module;
a second encoding module configured to encode the processed result of the processing module so as to obtain the second encoded data; and
a third sending module configured to send the second encoded data encoded by the second encoding module to the mobile device.

14. A system of claim 13, wherein the host further comprises
a first determining module configured to determine whether there is a preset character in the user data obtained by the obtaining module;
a dividing module configured to divide the user data into a plurality of data segments according to a position where the preset character is in the user data in case that the first determining module determines that there is a preset character in the user data;
a selecting module configured to select an unprocessed data segment from the data segments divided by the dividing module;
a second determining module configured to determine whether there is an unprocessed data segment in the divided data segments, if yes, trigger the selecting module; and
the first generating module configured to generated the networking data packet according to the data segment selected by the selecting module, the host port number, the mobile device port number, the host IP address and the mobile device IP address; and generate the networking data packet according to the data segment selected by the selecting module, the host port number, the mobile device port number, the host IP address and the mobile device IP address in case that the first determining module determines that there is not the preset character in the user data.

15. The system of claim 13, wherein the instruction is an application protocol data unit (APDU) instruction.

16. The system of claim 13, wherein the mobile device comprises:
a listening module configured to listen a preset port;
a creating module configured to create a connection descriptor corresponding to the host and establishing a connection with the host in case that the listening module listens a connecting request initiated by the host to the preset port;
the first sending module configured to send the networking data packet generated by the first generating module to the mobile device according to the connection descriptor; and
the second sending module configured to send the first encoded data encoded by the first encoding module to the peripheral, and send the networking data packet generated by the second generating module to the host according to the connection descriptor.

17. The system of claim 16, wherein the host comprises:
a connecting module configured to send a connecting request to the mobile device according to the mobile phone IP address and a port number of the preset port.

18. The system of claim 16, wherein
the second sending module is configured to send the first encoded data encoded by the first encoding module to the peripheral, and take the connection descriptor, the networking data packet and a length of the networking data packet as parameters, invoke Send function, and send the networking data packet to the host.

19. The system of claim 13, wherein the first converting module is configured to convert the valid data parsed by the second parsing module into the corresponding next step string (NSString) type of data from the next step data (NSData) type of data, convert the NSString type of data into a corresponding character type (char* type) of data, invoke string to hexadecimal (StrToHex) function, convert the char* type of data into a corresponding byte type of data, take the byte type of data as the converted instruction; or invoke the StringToHex function, and convert the valid data parsed by the second parsing module into the byte type of data from the String type of data, and take the byte type of data as the converted instruction; and
in case that the third determining module determines that the processed result is correct, convert the valid data in the processed result into a corresponding char type of data from the data modified by a mutable function (NSMUtableData) type of data, convert the char type of data into corresponding the NSString type of data, and take the NSString type of data as the converted data; or convert the valid data in the processed result into the String type of data from the byte type of data, and take the String type of data as the converted data.

20. The system of claim 13, wherein the mobile device comprises:
a detecting module configured to detect a peripheral connecting with the mobile device; and
the second sending module configured to send the networking data packet generated by the second generating module to the host, and in case that the detecting module detects only one peripheral connecting with itself, send the first encoded data to the peripheral; in case that the detecting module detects more peripherals connecting with itself, send the first encoded data to the peripheral connecting with itself via a preset interface.

21. The system of claim 13, wherein
the third determining module is configured to obtain a verification data in the processed result, and check for whether the verification data is the preset data, if yes, determine that the processed result is correct; otherwise, determine that the processed result is not correct.

22. The system of claim 13, wherein
the first generating module is configured to packet to obtain a transfer data packet according to the user data, the host port number and the mobile device port number; packet to obtain the networking data packet according to the transfer data packet, the host IP address and the mobile device IP address; and
the second parsing module is configured to parse the networking data packet received by the second receiving module so as to obtain the transfer data packet, and parse the transfer data packet so as to obtain the valid data.

23. The system of claim 13, wherein the first decoding module is configured to rectify the second encoded data, decode the rectified second encoded data so as to obtain the first encoded data; and decode a data unit in the first decoded data so as to obtain the second decoded data, determine whether the second decoded data is correct according to the verification data in the second decoded data, if yes, take the data in the second decoded data other than the verification data as the processed result; otherwise, discard the second decoded data.

* * * * *